(12) United States Patent
Voigt et al.

(10) Patent No.: US 12,145,512 B2
(45) Date of Patent: Nov. 19, 2024

(54) MODULE FOR A VEHICLE

(71) Applicant: Ford Global Technologies, LLC, Dearborn, MI (US)

(72) Inventors: Torsten Voigt, Roesrath (DE); Martin Dawid, Wermelskirchen (DE); Stefan Martin Buerger, Hilden (DE)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 17/984,625

(22) Filed: Nov. 10, 2022

(65) Prior Publication Data
US 2023/0173993 A1 Jun. 8, 2023

(30) Foreign Application Priority Data
Dec. 2, 2021 (DE) .......................... 102021131756.8

(51) Int. Cl.
*B60R 11/02* (2006.01)
(52) U.S. Cl.
CPC ................ *B60R 11/0235* (2013.01)
(58) Field of Classification Search
CPC .................................................. B60R 11/0235
See application file for complete search history.

(56) References Cited

U.S. PATENT DOCUMENTS

| | | | |
|---|---|---|---|
| 2011/0202862 A1* | 8/2011 | Kramer | G06F 3/16 715/771 |
| 2014/0009502 A1* | 1/2014 | Kim | G06F 3/0412 345/173 |
| 2018/0186294 A1* | 7/2018 | Koo | B60R 11/02 |
| 2018/0252916 A1* | 9/2018 | Nakamura | G02B 27/0101 |
| 2022/0057671 A1* | 2/2022 | Xu | B60K 35/50 |
| 2022/0242311 A1* | 8/2022 | Herrmann | B60R 1/04 |

FOREIGN PATENT DOCUMENTS

| | | | | |
|---|---|---|---|---|
| DE | 4329995 A1 * | 3/1995 | | G09F 7/20 |
| DE | 102013013694 B3 | 12/2014 | | |
| WO | 2020035612 A1 | 2/2020 | | |

* cited by examiner

*Primary Examiner* — Shawn S An
(74) *Attorney, Agent, or Firm* — Vichit Chea; Price Heneveld LLP (57) ABSTRACT

A module for a vehicle having an interior element and a display element having a screen area and connected to the interior element via an adjusting mechanism for adjusting the display element between an erect position, in which the screen area is arranged on a display side with respect to a horizontal displacement axis, and a lowered position, displaced, relative to the erect position, downwards with respect to the vertical axis of the vehicle and towards the display side with respect to the displacement axis and the screen area is pivoted downwards away from the vertical axis. The adjusting mechanism has a lower arm and an upper arm, each connected to the display element via a display pivot axis and to the interior element at least indirectly via at least one interior pivot axis, wherein in the erect position, the lower arm is lower than the upper arm.

17 Claims, 4 Drawing Sheets

MODULE FOR A VEHICLE

CROSS-REFERENCE TO RELATED APPLICATION

This application claims foreign priority benefits under 35 U.S.C. § 119(a)-(d) to German Patent Application No. 102021131756.8 filed on Dec. 2, 2021, which is hereby incorporated by reference in its entirety.

FIELD OF THE DISCLOSURE

The present disclosure generally relates to vehicle display modules, and more particularly relates to a module for a vehicle having an adjustable display mechanism.

BACKGROUND OF THE DISCLOSURE

In motor vehicles, mechanical control elements such as buttons, switches or controllers are increasingly being replaced by virtual control elements, which are typically shown on a touchscreen. Generally, the touchscreen also serves to display information. Displays and virtual control elements can additionally be adapted and changed in different ways, for example by switching between different modes or menus which can relate, for example, to navigation, vehicle functions, and entertainment media. Versatile usability is thus provided. However, some touchscreens generally require a relatively large area, such as, for example in the region of the dashboard, limiting use of this area for other purposes, for example as access to storage compartments.

It would be desirable to provide flexible, reliable usability of a vehicle interior which has at least one screen.

SUMMARY OF THE DISCLOSURE

According to a first aspect of the present disclosure, a module for a vehicle is provided. The module for a vehicle includes an interior element, a display element which has a screen area, and an adjusting mechanism connecting the display element to the interior element and for adjusting the adjusting mechanism between an erect position, in which the screen area is arranged on a display side with respect to a horizontal displacement axis, and a lowered position, in which the screen area is displaced, relative to the erect position, downwards with respect to a vertical axis of the vehicle and towards the display side with respect to the horizontal displacement axis and the screen area is pivoted downwards away from the vertical axis. The adjusting mechanism has a lower arm and an upper arm, each of which is connected to the display element via a display pivot axis and to the interior element at least indirectly via at least one interior pivot axis, wherein in the erect position the lower arm is arranged lower than the upper arm.

According to a second aspect of the present disclosure, a module for a vehicle is provided. The module include an interior element which is at least a part of a center console and/or a dashboard, a display element which has a screen area, and an adjusting mechanism connecting the display element to the interior element and for adjusting the adjusting mechanism between an erect position, in which the screen area is arranged on a display side with respect to a horizontal displacement axis, and a lowered position, in which the screen area is displaced, relative to the erect position, downwards with respect to a vertical axis of the vehicle and towards the display side with respect to the horizontal displacement axis and the screen area is pivoted downwards away from the vertical axis. The adjusting mechanism has a lower arm and an upper arm, each of which is connected to the display element via a display pivot axis and to the interior element at least indirectly via at least one interior pivot axis, wherein in the erect position the lower arm is arranged lower than the upper arm. The module for a vehicle also includes an access opening of a storage space formed in the region of the interior element, to which access is at least restricted by the display element in one of the erect position or the lowered position and which can be at least largely freed by adjusting the display element into the respective other of the erect position and the lowered position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

In the different figures, identical parts are always provided with the same reference signs, and for this reason such parts are generally also described only once.

Figure 1:
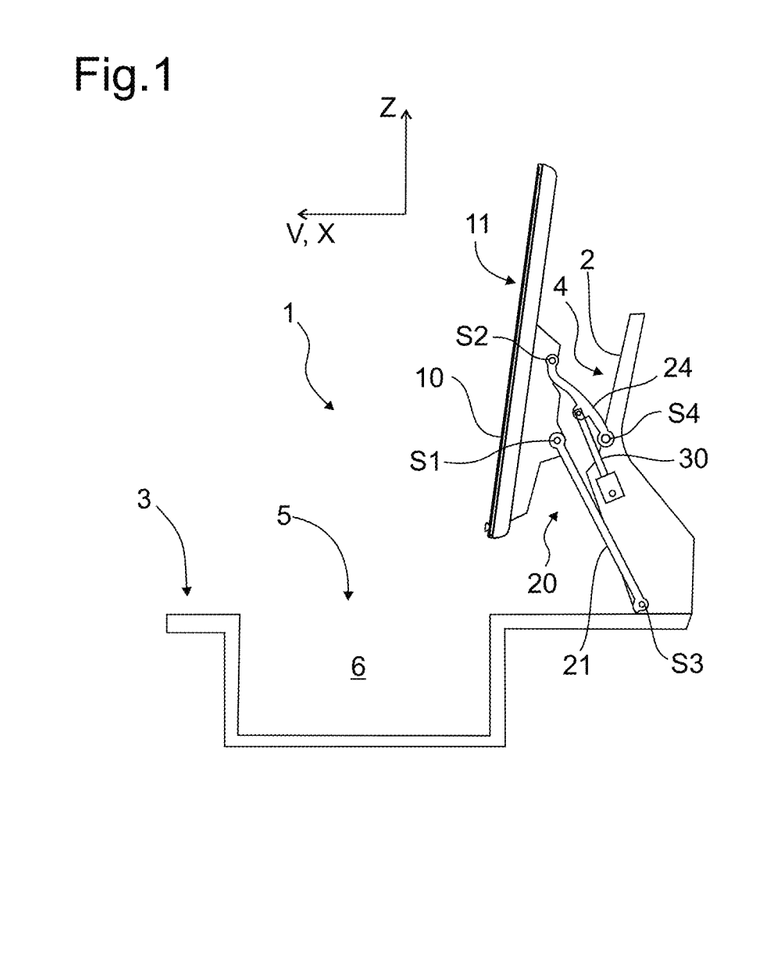
FIG. 1 is a sectional view of a first embodiment of a module with a display element in an erect position.
Figure 2:
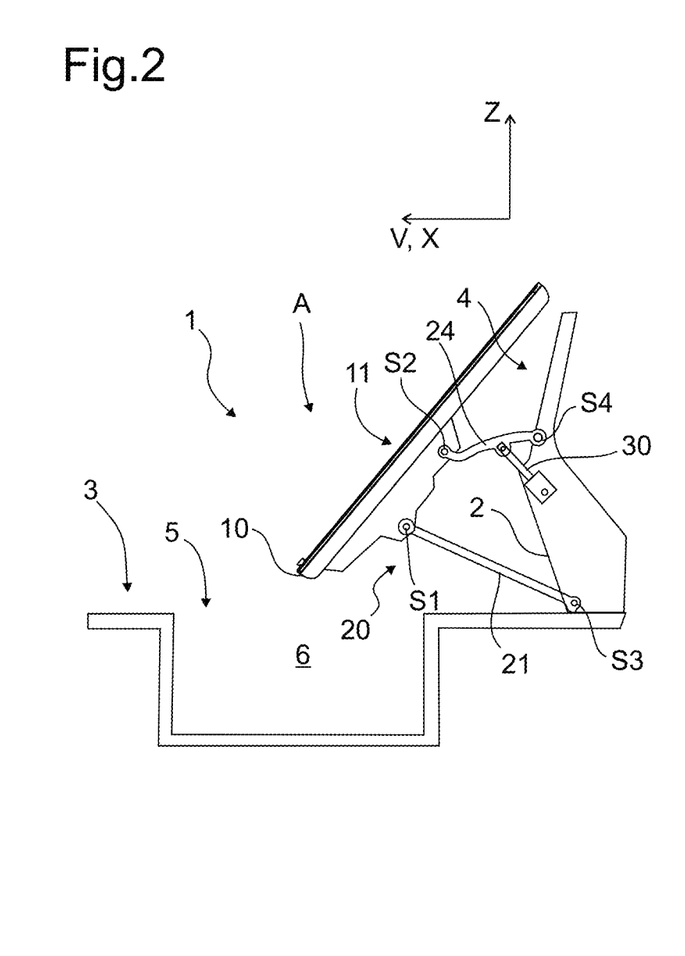
FIG. 2 is a sectional view of the module of FIG. 1 with the display element in a lowered position.

FIGS. 1 and 2 show a first embodiment of a module 1, which is installed in the interior of a motor vehicle, in this example a passenger car. An interior element 2 of the module 1 is associated in part with a center console 3 and with a dashboard 4. In the center console 4 there is formed a storage space 6 which can be accessed via an access opening 5. A display element 10, which can serve, for example, to display information relating to navigation, general vehicle operation or entertainment media, has a screen area 11 which can be formed, for example, by a flat screen and which at the same time is in the form of a touchscreen. Accordingly, various virtual control elements can be displayed on the screen area 11, to allow a user (for example the driver) to control various functions.

The display element 10 is connected to the interior element 2 via an adjusting mechanism 20. The adjusting mechanism has a lower arm 21, which is connected via a first display pivot axis S1 to the display element 10 and via a first interior pivot axis S3 to the interior element 2, and an upper arm 24, which is connected via a second display pivot axis S2 to the display element 10 and via a second interior pivot axis S4 to the interior element 2. The adjusting mechanism 20 additionally has an actuator 30, here shown in highly diagrammatic form, which connects the upper arm 24 to the inner element 2.

FIG. 1 shows the display element 10 in a raised or erect position, in which the screen area 11 encloses a comparatively small angle of in this example about 10° with a vertical axis (Z-axis) of the vehicle. With respect to a displacement axis V, which in this embodiment is identical to the longitudinal axis (X-axis) of the vehicle, the screen area 11 is arranged on a display side A. The display element 10 is arranged in the vicinity of the surface of the dashboard 4 and approximately parallel thereto. The screen area 11 can easily be read and reached for the inputting of commands by the driver. The access opening 5 of the storage space 6 is freely accessible.

By use of the actuator 30, which in the example shown acts in the form of a linear actuator on the upper arm 24 and is able to apply a torque thereto, the display element 10 can be adjusted into a lowered position shown in FIG. 2. The movement corresponds to a combination of a pivot movement and a translational displacement. With the translational displacement, the display element 10 as a whole is displaced downwards with respect to the vertical axis and along the displacement axis V towards the display side A. In accordance with the pivot movement, the screen area 11 is pivoted away from the vertical axis Z until it is finally oriented at an angle of about 40° relative to the vertical axis Z. The pivot movement takes place about a (non-stationary) virtual pivot axis perpendicular to the plane of the drawing, that is to say parallel to the transverse axis (Y-axis). Because the two arms 21, 24 have a fixed length and are connected to the interior element 2 via stationary interior pivot axes S3, S4 and to the display element 10 via display pivot axes S1, S2 which are stationary with respect to the display element 10, the translational displacement of the display element 10 is positively coupled with the pivot movement, that is to say a specific inclination relative to the vertical axis Z is associated with a (translational) position of the display element 10.

As is illustrated in FIGS. 1 and 2, both in the erect (raised) position and in the lowered position the display element 10 is arranged comparatively close to the surface of the dashboard 4 or of the center console 3, respectively, wherein it partially covers the access opening 5 in the lowered position so that the contents of the storage space 6 are difficult to access and are partially hidden from view. By adjusting the display element into the erect position again, the storage space 6 can be accessed again without restriction. The screen area 11 is thereby readily visible to and usable by the driver and passenger not only in the erect position but also in the lowered position.

Figure 3:
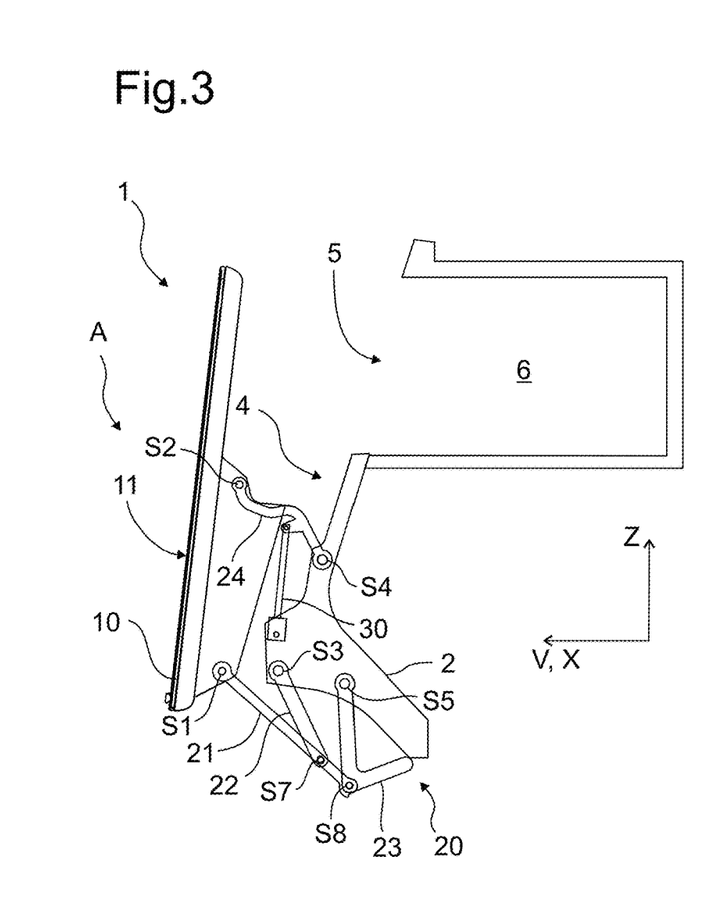
FIG. 3 is a sectional view of a second embodiment of a module with a display element in an erect position.
Figure 4:
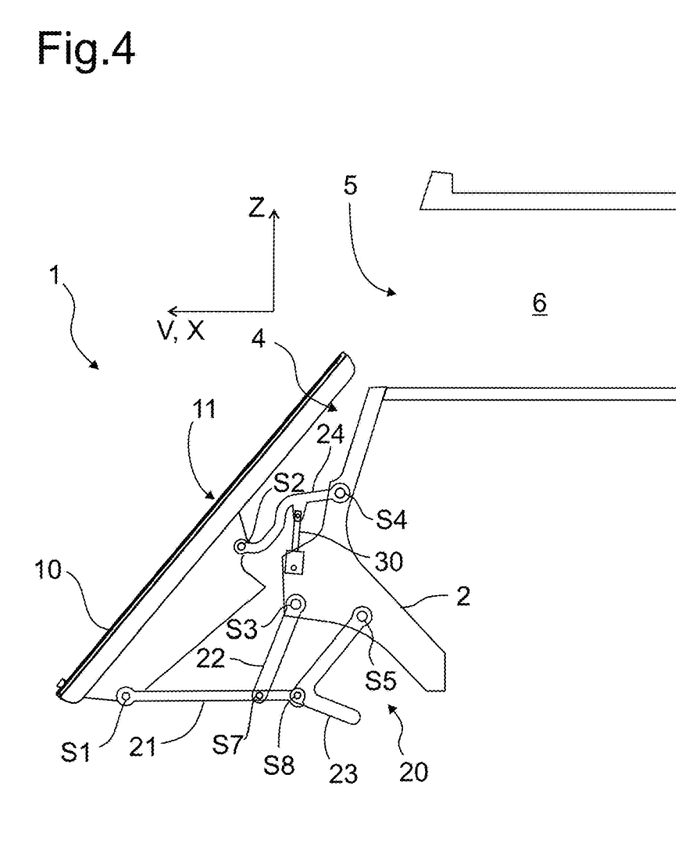
FIG. 4 is a sectional view of the module of FIG. 3 with the display element in a lowered position.
Figure 7:
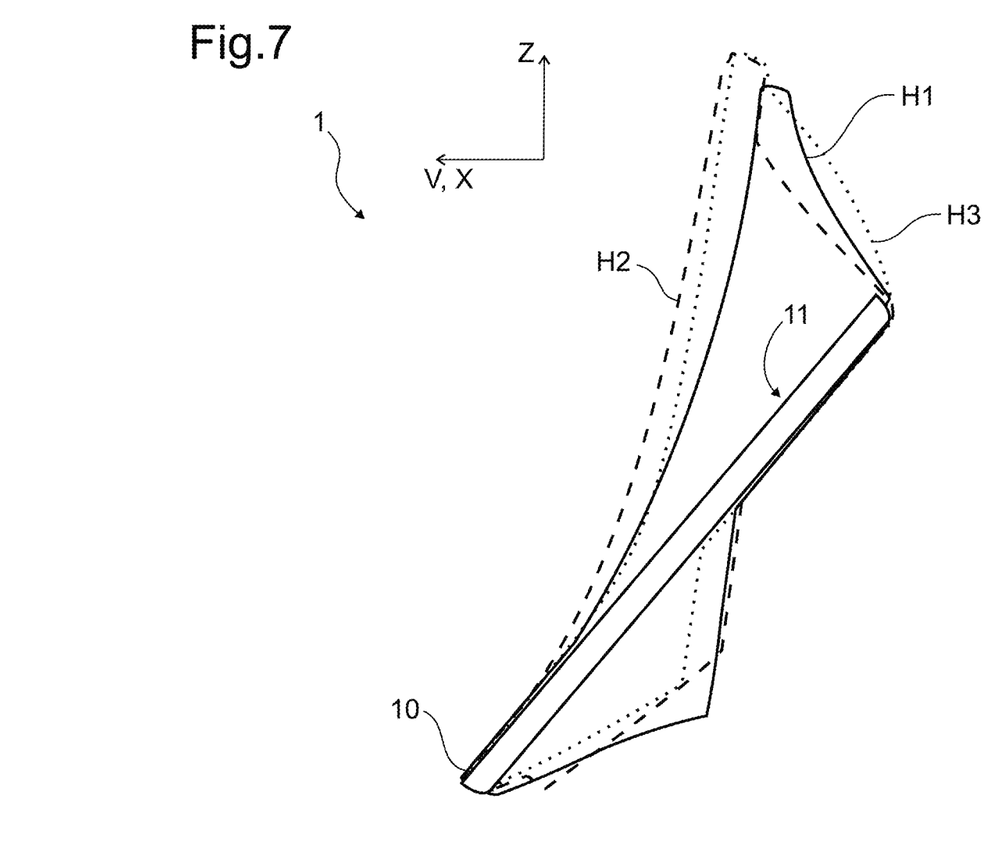
FIG. 7 is a view of envelope curves of the display element in the case of adjustment according to the first, second and third embodiments.

FIGS. 3 and 4 show a second embodiment of a module 1, in which the interior element 2 is associated wholly with the dashboard 4. The adjusting mechanism 20 differs from the first embodiment in particular in that the lower arm 21 is not connected directly to the interior element 2 but is connected to two lower auxiliary arms 22, 23 via a first intermediate pivot axis S7 and a second intermediate pivot axis S8, wherein the first lower auxiliary arm 22 is pivotably connected to the interior element 2 via a first interior pivot axis S3 and the second lower auxiliary arm 23 is pivotably connected to the interior element 2 via a third interior pivot axis S5. As a result of this indirect coupling, the lower pivot arm 21 and in particular the first display pivot axis S1 at the display element 10 do not move on an arcuate path. As a result, the display element 10 moves into a higher erect position while it maintains a greater distance from the dashboard 4 in the upper region. This is apparent from FIG. 7, which shows the display element 10 in the lowered position as well as a first envelope curve H1 (as a solid line) corresponding to the first exemplary embodiment, a second envelope curve H2 (as a broken line) corresponding to the second exemplary embodiment and a third envelope curve H3 (as a dotted line) corresponding to the third exemplary embodiment. In the example shown, a storage space 6, for example a glove compartment, is formed above the pivot mechanism 22, which storage space is again accessible via an access opening 5. In the erect position according to FIG. 3, access to the storage space 6 is not possible or is possible to only a very limited extent. However, if the display element 10 is adjusted into the lowered position shown in FIG. 4, the storage space 6 can be accessed unhindered. Adjustment of the display element 10 again takes place via an actuator 30 shown schematically here.

Figure 5:
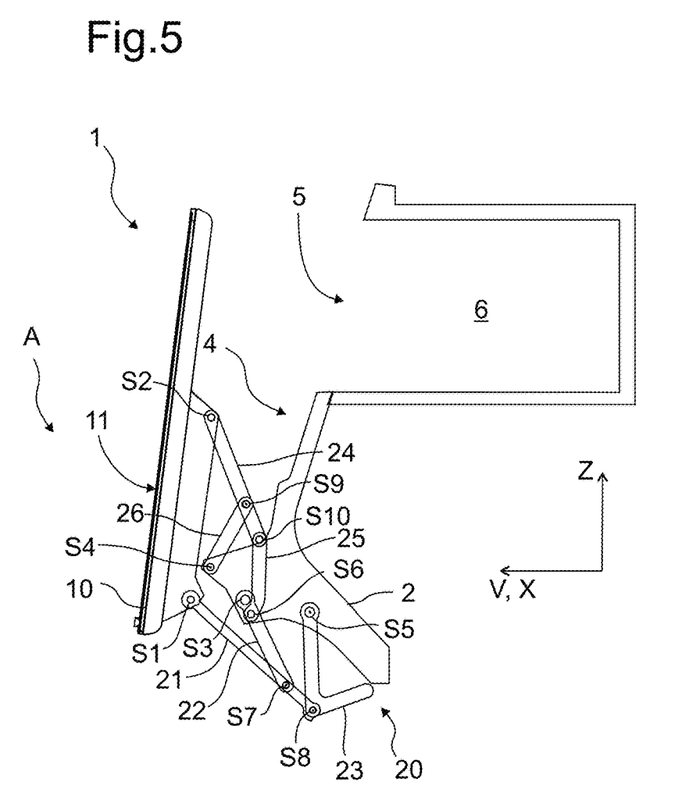
FIG. 5 is a sectional view of a third embodiment of a module with a display element in an erect position.
Figure 6:
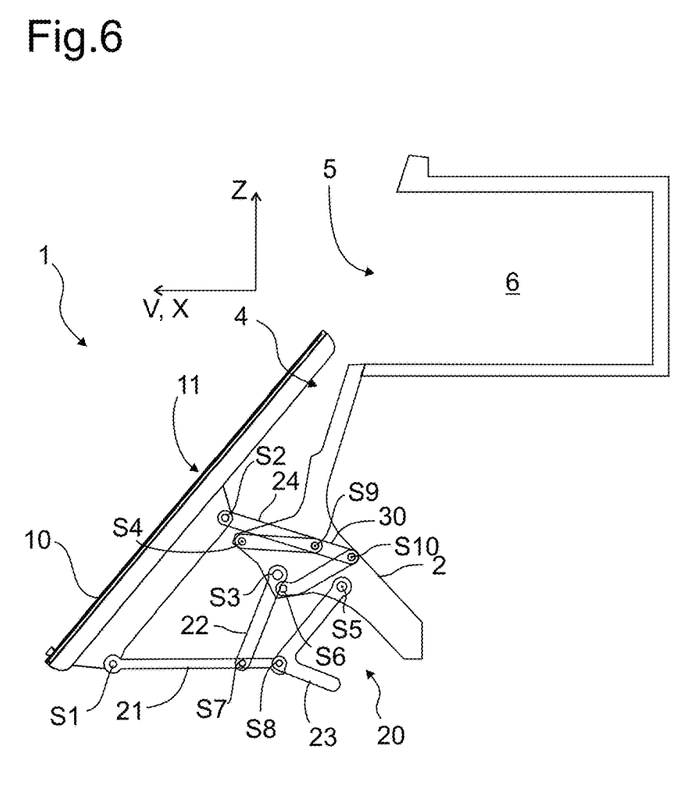
FIG. 6 is a sectional view of the module of FIG. 5 with the display element in a lowered position.

FIGS. 5 and 6 show a third embodiment, which largely corresponds to the second embodiment and in this respect will not be explained again. However, while in the second embodiment the upper arm 24 is connected directly to the interior element 2 via the second interior pivot axis S4, in the third embodiment the upper arm 24 is connected to a first upper auxiliary arm 26 via a third intermediate pivot axis S9 and to a second upper auxiliary arm 25 via a fourth intermediate pivot axis S10. The mentioned upper auxiliary arms 26, 25 are in turn connected to the interior element 2 via a second interior pivot axis S4 and a fourth interior pivot axis S6, respectively. In this respect, unlike in the second embodiment, the second display pivot axis S2 moves not in an arcuate manner but on a more complex path which is determined substantially by the arrangement of the second and fourth interior pivot axes S4, S6 and the third and fourth intermediate pivot axes S9, S10 and the spacing thereof. As is apparent from FIG. 7, it is thereby achieved that the display element 10, compared to the second embodiment, moves back to the front (towards the dashboard 4) earlier or further with respect to the longitudinal axis X, while it is arranged higher compared to the first embodiment in the erect position.

In the example shown here there is no actuator for adjusting the display element 10, that is to say it can be adjusted manually, for example, wherein the adjusting mechanism 20 to a certain extent haptically guides the user to repeatably set the erect position, the lowered position and optionally different intermediate positions. An actuator for adjusting the display element 10 could optionally also be provided in the case of the third embodiment. A lock (not shown here) could also be provided, which is urged, for example by use of a restoring element, in the direction towards a locking position in which it blocks the adjusting mechanism 20. The lock could be adjusted into a release position by the actuator, wherein it returns to the locking position when the actuator is inactive (e.g., when the ignition is switched off). The actuator 30 could optionally also be omitted in the first and second embodiments, so that the adjustment of the display element 10 can take place manually.

It should be noted that the features and measures mentioned individually in the description can be combined with one another in any technically expedient manner and indicate further embodiments of the disclosed module. The description additionally characterizes and specifies the disclosed embodiment in particular in association with the figures.

The disclosure provides a module for a motor vehicle. The module is intended in particular for motor vehicles such as trucks or lorries, or passenger cars including SUVs, sedans, vans and other wheeled vehicles. However, use for aircraft or water-craft, for example, is conceivable at least in some embodiments. In addition to the elements mentioned explicitly herein below, the module can also have further elements.

The module has an interior element and a display element which has a screen area and is connected to the interior element via an adjusting mechanism. The interior element is associated with the interior of the vehicle and can have a surface which is accessible from the interior. However, it could also be provided with a covering which forms the corresponding surface and which may possibly not be regarded as being part of the interior element. In the case of a motor vehicle with a plurality of rows of seats, the interior element can be arranged in the region of the front or frontmost row of seats, that is to say, in non-autonomous vehicles, in the region of the driver's seat or passenger seat. The display element has a screen area. The screen area serves for electronic, normally digital, visual display. That is to say, visual information which can be changed can be displayed on the screen area. The screen area is part of a screen or can also be referred to by way of simplification as a screen or display. The screen area is normally of planar form but could also have a convex and/or concave curvature. The display element can be part of an infotainment system of the vehicle, wherein entertainment information as well as information relating to the operation of the vehicle can be displayed via the screen area. In particular, the screen area can at the same time function as an input area, that is to say virtual control elements can be displayed on the screen area and the fact that a control element is touched by a user can be registered via sensors. The display element is connected to the interior element via the adjusting mechanism, wherein it is conceivable that the connection is made indirectly via a mount to which the display element is removably connected. Such a mount could, however, also be regarded as being part of the adjusting mechanism.

The display element is adjustable by use of the adjusting mechanism between a raised or erect position, in which the screen area is arranged on a display side with respect to a horizontal displacement axis, and a lowered position, in which it is displaced, relative to the lowered position, downwards with respect to the vertical axis of the vehicle and towards the display side with respect to the displacement axis and the screen area is pivoted downwards away from the vertical axis. The erect position and the lowered position form end positions of an adjusting movement, which can be regarded as a combination of a translational displacement and a rotation. In the erect position, the screen area is arranged on one side with respect to a horizontal axis, which is here referred to as the displacement axis, the side being referred to as the display side. The term "display side" refers to the fact that a user is able to see the screen area from this side. The displacement axis runs horizontally with respect to the state installed as intended in the vehicle, that is to say, within the X-Y plane of the vehicle. The display element (or the screen area) can be referred to as erect in the erect position, wherein the screen area can enclose an angle of, for example, in the range of between 0° and 45° or between 0° and 30° with the vertical axis (Z-axis) of the vehicle.

With the translational displacement, the display element is displaced downwards from the erect position to the lowered position and also along the horizontal displacement axis towards the display side. The screen area is thus pivoted away from the vertical axis and approaches or reaches a horizontal or lying position. In some circumstances, the screen area in the lowered position can be arranged horizontally, that is to say at an angle of 90° relative to the vertical axis. Although reference is explicitly made here to the erect position and the lowered position, the display element of course passes through intermediate positions during the adjustment, which in some circumstances can also advantageously be usable. The adjustment between the erect position and the lowered position on the one hand permits an orientation of the screen area that is advantageous for the observer. A user is thus on the one hand able to position the screen area so that the user looks as straight as possible at the screen area. In addition, it is possible to minimize interfering reflections by the positioning of the screen area. Because the inclination of the screen area relative to the vertical axis changes, the pivot movement takes place about a virtual pivot axis which runs at least in part, normally completely, horizontally. This is in contrast to a pivot movement about a vertical axis in the case of which the screen area could be pivoted away from a driver, for example, which could prevent him from seeing possibly important information. Normally, the virtual pivot axis runs perpendicular to the displacement axis and in the horizontal plane. By the combination of the pivot movement with the translational adjustment, it is possible for the display element to be arranged comparatively close to the surrounding surfaces of the interior in both the mentioned positions, that is to say it does not have to project a long way into the interior in either of the positions, which could annoy the occupants or contribute to undesirable contact with the display element, as a result of which the display element could be damaged.

According to the disclosure, the adjusting mechanism has a lower arm and an upper arm, each of which is connected to the display element via a display pivot axis and to the interior element at least indirectly via at least one interior pivot axis, wherein in the erect position the lower arm is arranged at least in part lower than the upper arm. The arms could also be referred to as levers, pivot arms or pivot levers. Each of the arms can normally be regarded as being an element which in itself is rigid and which deforms at most negligibly during normal operation. The arms are each pivotably connected to the display element via a display pivot axis, wherein the respective display pivot axis runs parallel to the virtual pivot axis of the display element, that is to say normally perpendicular to the displacement axis and in the horizontal plane. Each arm is pivotably attached to sides of the interior element, specifically via at least one interior pivot axis. The connection can be made directly or indirectly, wherein the interior pivot axis is arranged in the former case on the arm and in the latter case on an element interposed between the arm and the interior element. In the erect position, the entire lower arm can be arranged (with respect to the vertical axis) lower than the upper arm, but it is also possible that only parts of the lower arm are arranged lower than the upper arm.

It has been found that the connection via (pivot) arms is advantageous compared to other conceivable solutions. Specifically, a play-free connection between the display element and the interior element can optimally be achieved with the type of connection according to the disclosure. This is especially because the pivot mechanism predominantly or normally requires only pivot bearings (which correspond to the pivot axes). These can be produced in a play-free manner without problems and retain this property even over prolonged periods, in contrast, for example, to a rail guide or linear guide which may be difficult to implement especially on account of the considerable weight of a typical display element (1-3 kg, for example, depending on the type) and tend to become worn as their service life increases, which in turn, may impair the mechanical properties. By contrast, a pivot bearing can readily be implemented with negligible play and, in the form of a roller bearing, for example, scarcely has a tendency to become worn. For the user, this thus results in reliable usability even in the long term, with the option to adjust the display element into an optimal position and in this way make optimal use of the interior of the vehicle.

The displacement and the pivoting of the display element are preferably positively coupled by the adjusting mechanism. That is to say, the adjusting mechanism reduces the number of degrees of freedom to one. A specific inclination of the display element thus corresponds to a specific (translational) position, and vice versa. In addition, the erect position and the lowered position are also precisely defined by the positive coupling. As a result of the positive coupling, on the one hand optimal end positions can repeatably be assumed and on the other hand the adjusting movement between those end positions can repeatably be optimally carried out.

It is conceivable in principle that the adjustment of the display element takes place manually, wherein the user can take hold of the display element and adjust it by the application of force. A positive coupling as described above can also be advantageous, because it assists the user with the adjustment and to a certain extent guides him to carry out an intended adjusting movement. According to an alternative embodiment, the display element is adjustable between the erect position and the lowered position by use of an actuator. A single (generally electrical) actuator can advantageously be provided here. In this case too, the above-described positive coupling facilitates efficient, repeatable adjustment by use of only one actuator.

It can likewise be advantageous if the display element can be locked in at least one position by use of an actuator. Such locking could include, for example, an actuating drive configured to be self-locking, so that the display element cannot be adjusted by external forces when the actuator is inactive. Alternatively, an actuator could also serve merely to establish or release locking, for example via interlocking engagement. That is to say, lockability by use of an actuator could also be provided independently of adjustability by use of an actuator. It may be preferred that the actuator actively releases the locking, and locking is established automatically (e.g., by use of a restoring element) when the actuator is inactive.

In the region of the interior element there can advantageously be formed an access opening of a storage space, to which access is at least restricted by the display element in the erect position or the lowered position and which can be at least largely freed by adjusting the display element into the respective other position. That is to say, in the erect position or in the lowered position, the display element is so arranged that access to the storage space through the access opening is only partly possible or is even impossible for a user. This is generally not a problem inasmuch as access to a storage space such as, for example, a storage compartment is not normally necessary constantly, in some circumstances is even necessary only rarely. In some circumstances, it can even be desirable that the access opening is covered wholly or partially by the display element so that the contents of the storage space are not visible from outside. It can also be possible that the position in which access to the storage space is restricted constitutes the most ergonomically advantageous position of the display element. If the display element is adjusted into the respective other position (lowered position or erect position), the access opening is freed wholly or at least partially, so that access to the storage space is either possible unhindered or is at least more possible than in the position assumed previously. In particular in the case of a storage space inside the dashboard, the access opening can be covered (wholly or partially) in the erect position, while in the case of a storage space inside a center console it can be covered wholly or partially in the lowered position. The storage space and the access opening can be formed in the interior element or in another element, which can likewise be regarded as being part of the module.

According to one embodiment, the displacement axis corresponds to the longitudinal axis of the vehicle and the display side is arranged on the rear side with respect to the longitudinal axis. It could also be described that the screen area points to the rear in the erect position. Accordingly, a user has a good view of the screen area when the display element is in front of the user (towards the front of the vehicle), possibly also obliquely in front of the user. This corresponds to a natural, ergonomically expedient viewing direction.

Generally, the interior element can be, for example, an armrest, a seat back or the like. The interior element in one embodiment belongs at least in part to a center console and/or to a dashboard. The interior element can thereby form part of the center console and/or dashboard or can form one of the mentioned elements in its entirety. The interior element does not necessarily have to form the surface that faces the user but could be provided with a covering. In this embodiment, the interior element is arranged both in the viewing range of the driver and within the driver's reach. The same then normally applies also to the display element. In this embodiment, the displacement axis preferably corresponds to the longitudinal axis. The screen area can remain visible to the driver regardless of the position of the display element, because only the inclination thereof relative to the vertical axis changes, that is to say the screen area is not normally pivoted sideways away from the driver, whereby in some circumstances he would no longer effectively be able to read the displayed information.

According to one embodiment, at least one of the arms is pivotably connected directly to the interior element via an interior pivot axis. The corresponding arm is thus on the one hand pivotably connected to the display element and on the other hand pivotably connected to the interior element. Accordingly, the part of the display element connected thereto, or the display pivot axis, moves in an arc around the interior pivot axis arranged on the side of the interior element. It is also possible for both arms to be connected directly to the interior element. Even in the case of this simple embodiment, different movements or positions of the display element can be achieved by suitably choosing the length of the arms and the position of the display pivot axes and of the interior pivot axes.

In some circumstances, a different, for example not non-arcuate, movement of the display pivot axis can be desirable. This can be achieved, for example, in that the upper arm is pivotably connected via an intermediate pivot axis to two upper auxiliary arms, each of which is pivotably connected to the interior element via an interior pivot axis. The upper arm is thus connected indirectly to the interior element at two points, namely via the two auxiliary arms. By suitably choosing the distances between the different pivot axes of the two auxiliary arms, different constraints and thus different movement paths of the upper arm can be achieved. This can all be achieved solely with pivot axes, that is to say it is possible to use only pivot bearings, which permit (virtually) play-free guiding.

Alternatively or additionally, the lower arm can be pivotably connected via an intermediate pivot axis to two lower auxiliary arms, each of which is pivotably connected to the interior element via an interior pivot axis. Diverse, non-arcuate movements of the lower arm can also be achieved thereby. Particular configuration possibilities arise when both the lower arm and the upper arm are each connected to the interior element via two (lower and upper) auxiliary arms. The movement paths of two pivot axes on the display element can thus be determined individually, whereby the relationship between the (translational) position and the pivot angle of the display element can in turn be defined. In this case too, only a plurality of pivot axes or pivot bearings is necessary for the implementation, so that (virtually) play-free guiding is possible.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A module for a vehicle, the module comprising:
   an interior element;
   a display element which has a screen area; and
   an adjusting mechanism connecting the display element to the interior element and for adjusting the adjusting mechanism between an erect position, in which the screen area is arranged on a display side with respect to a horizontal displacement axis, and a lowered position, in which the screen area is displaced, relative to the erect position, downwards with respect to a vertical axis of the vehicle and towards the display side with respect to the horizontal displacement axis and the screen area is pivoted downwards away from the vertical axis, wherein the adjusting mechanism has a lower arm and an upper arm, each of which is connected to the display element via a display pivot axis and to the interior element at least indirectly via at least one interior pivot axis, wherein in the erect position the lower arm is arranged lower than the upper arm; and
   an access opening of a storage space formed in a region of the interior element, to which access is at least restricted by the display element in one of the erect position of the lowered position and which can be at least largely freed by adjusting the display element into the respective other of the erect position and the lowered position.

2. The module according to claim 1, wherein the displacement and the pivoting of the display element are positively coupled by the adjusting mechanism.

3. The module according to claim 2 further comprising an actuator for adjusting the display element between the erect position and the lowered position.

4. The module according to claim 3, wherein the actuator is configured to lock the display element in at least one position.

5. The module according to claim 1, wherein the horizontal displacement axis corresponds to a longitudinal axis of the vehicle and the display side is arranged on the rear side with respect to the longitudinal axis.

6. The module according to claim 1, wherein the interior element is at least part of a center console and/or a dashboard.

7. The module according to claim 1, wherein at least one of the upper and lower arms is pivotably connected directly to the interior element via an interior pivot axis.

8. A module for a vehicle, the module comprising:
   an interior element;
   a display element which has a screen area; and
   an adjusting mechanism connecting the display element to the interior element and for adjusting the adjusting mechanism between an erect position, in which the screen area is arranged on a display side with respect to a horizontal displacement axis, and a lowered position, in which the screen area is displaced, relative to the erect position, downwards with respect to a vertical axis of the vehicle and towards the display side with respect to the horizontal displacement axis and the screen area is pivoted downwards away rom the vertical axis, wherein the adjusting mechanism has a lower arm and an upper arm, each of which is connected to the display element via a display pivot axis and to the interior element at least indirectly via at least one interior pivot axis, wherein in the erect position the lower arm is arranged lower than the upper arm, and wherein the upper arm is pivotably connected via an intermediate pivot axis to two upper auxiliary arms, each of which is pivotably connected to the interior element via an interior pivot axis.

9. The module according to claim 8, wherein the lower arm is pivotably connected via an intermediate pivot axis to two lower auxiliary arms, each of which is pivotably connected to the interior element via an interior pivot axis.

10. A module for a vehicle, the module comprising:
    an interior element which is at least a part of a center console and/or a dashboard;
    a display element which has a screen area;
    an adjusting mechanism connecting the display element to the interior element and for adjusting the adjusting mechanism between an erect position, in which the screen area is arranged on a display side with respect to a horizontal displacement axis, and a lowered position, in which the screen area is displaced, relative to the erect position, downwards with respect to a vertical axis of the vehicle and towards the display side with respect to the horizontal displacement axis and the screen area is pivoted downwards away from the vertical axis, wherein the adjusting mechanism has a lower arm and an upper arm, each of which is connected to the display element via a display pivot axis and to the interior element at least indirectly via at least one interior pivot axis, wherein in the erect position the lower arm is arranged lower than the upper arm; and
    an access opening of a storage space formed in a region of the interior element, to which access is at least restricted by the display element in one of the erect position or the lowered position and which can be at least largely freed by adjusting the display element into the respective other of the erect position and the lowered position.

11. The module according to claim 10, wherein the displacement and the pivoting of the display element are positively coupled by the adjusting mechanism.

12. The module according to claim 11 further comprising an actuator for adjusting the display element between the erect position and the lowered position.

13. The module according to claim 12, wherein the actuator is configured to lock the display element in at least one position.

14. The module according to claim 10, wherein the horizontal displacement axis corresponds to a longitudinal axis of the vehicle and the display side is arranged on the rear side with respect to the longitudinal axis.

15. The module according to claim 10, wherein at least one of the upper and lower arms is pivotably connected directly to the interior element via an interior pivot axis.

16. The module according to claim 15, wherein the upper arm is pivotably connected via an intermediate pivot axis to two upper auxiliary arms, each of which is pivotably connected to the interior element via an interior pivot axis.

17. The module according to claim 16, wherein the lower arm is pivotably connected via an intermediate pivot axis to two lower auxiliary arms, each of which is pivotably connected to the interior element via an interior pivot axis.

* * * * *

UNITED STATES PATENT AND TRADEMARK OFFICE
CERTIFICATE OF CORRECTION

PATENT NO. : 12,145,512 B2  
APPLICATION NO. : 17/984625  
DATED : November 19, 2024  
INVENTOR(S) : Voigt et al.

Page 1 of 1

It is certified that error appears in the above-identified patent and that said Letters Patent is hereby corrected as shown below:

In the Claims

Column 9:  
Claim 1, Line 28;  
After "area;" delete "and".  
Claim 1, Line 48;  
"of" should be — or —.

Column 10:  
Claim 8, Line 16;  
"rom" should be — from —.

Signed and Sealed this  
Thirty-first Day of December, 2024

Derrick Brent  
*Acting Director of the United States Patent and Trademark Office*